Patented Aug. 1, 1933

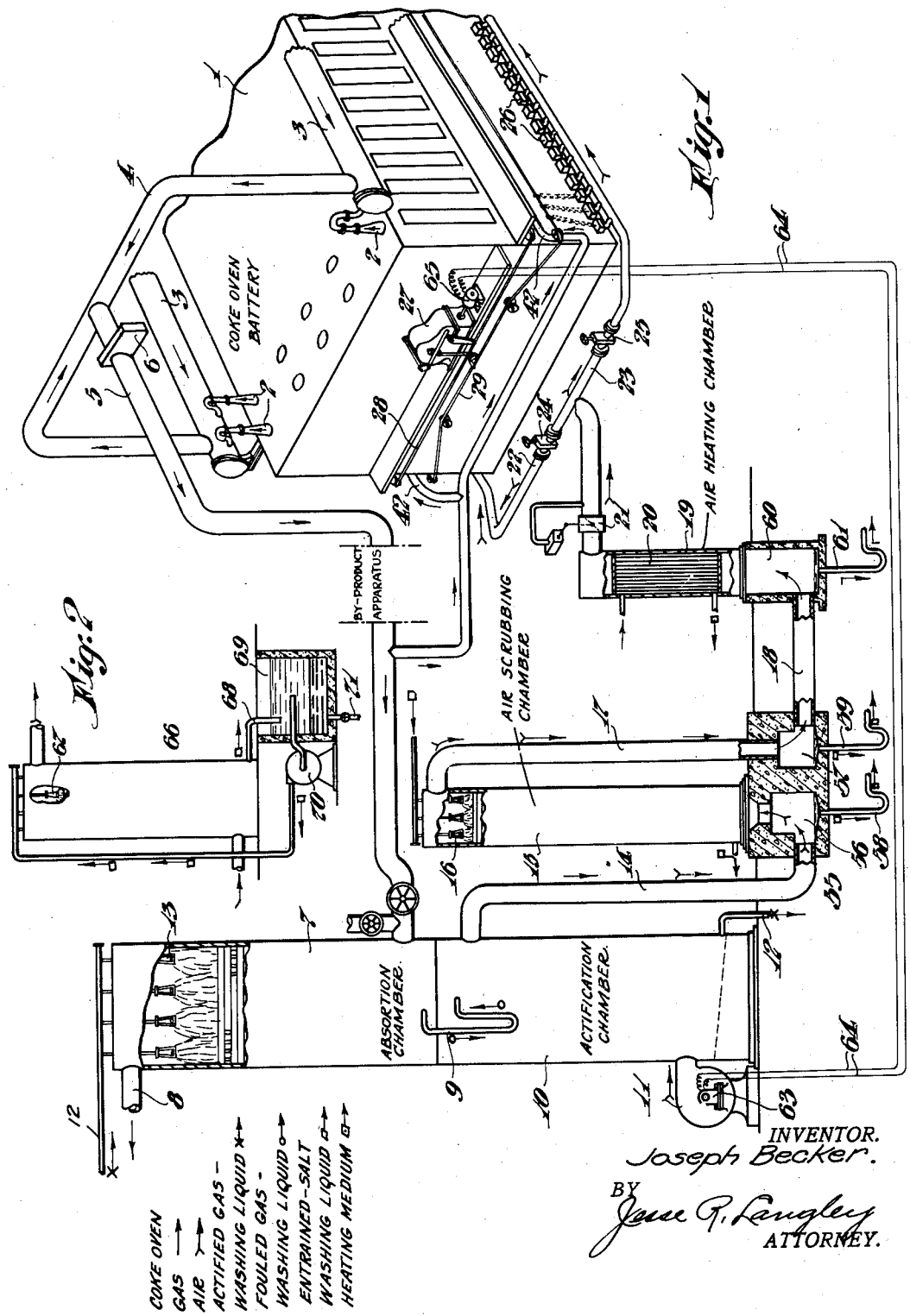

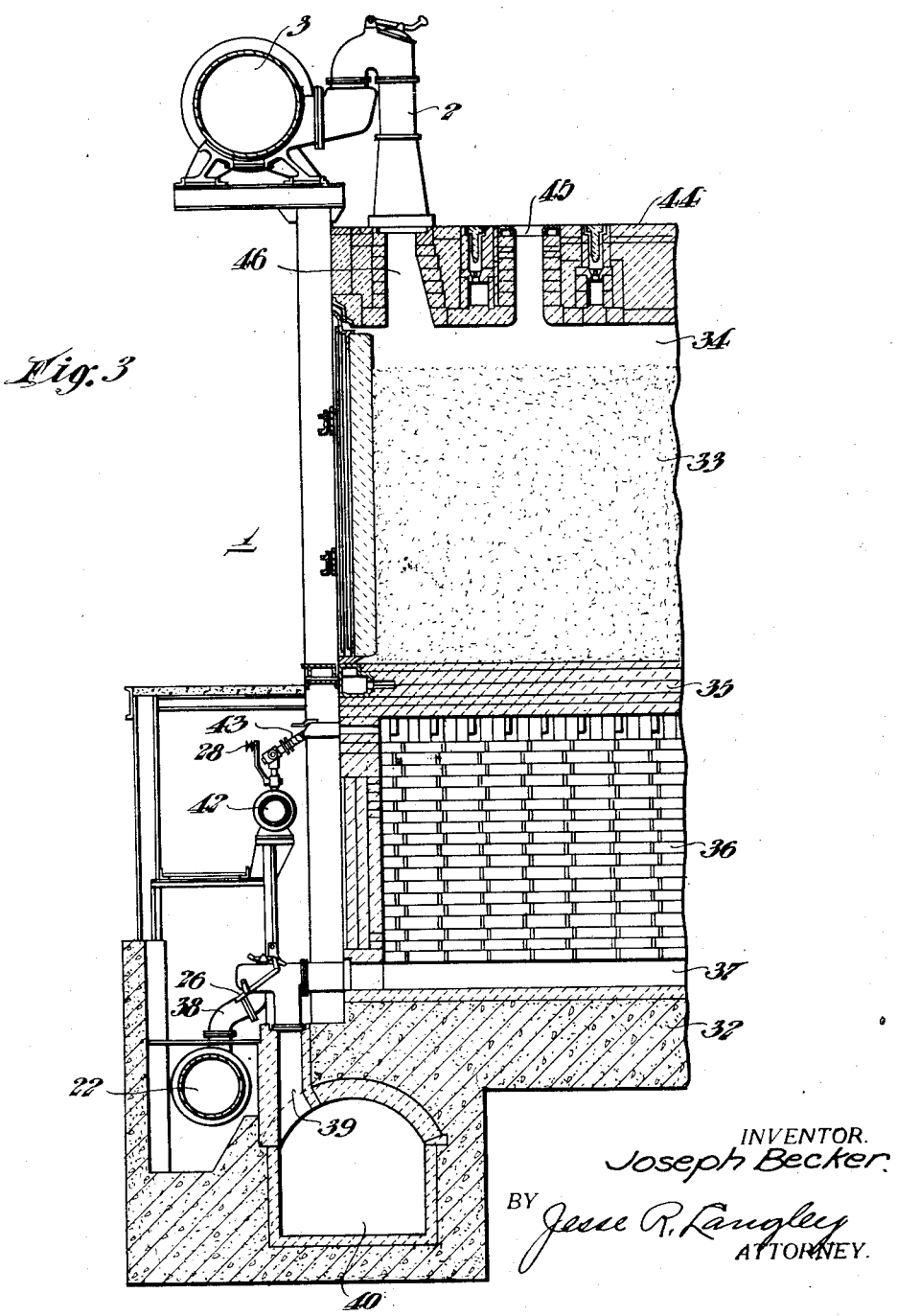

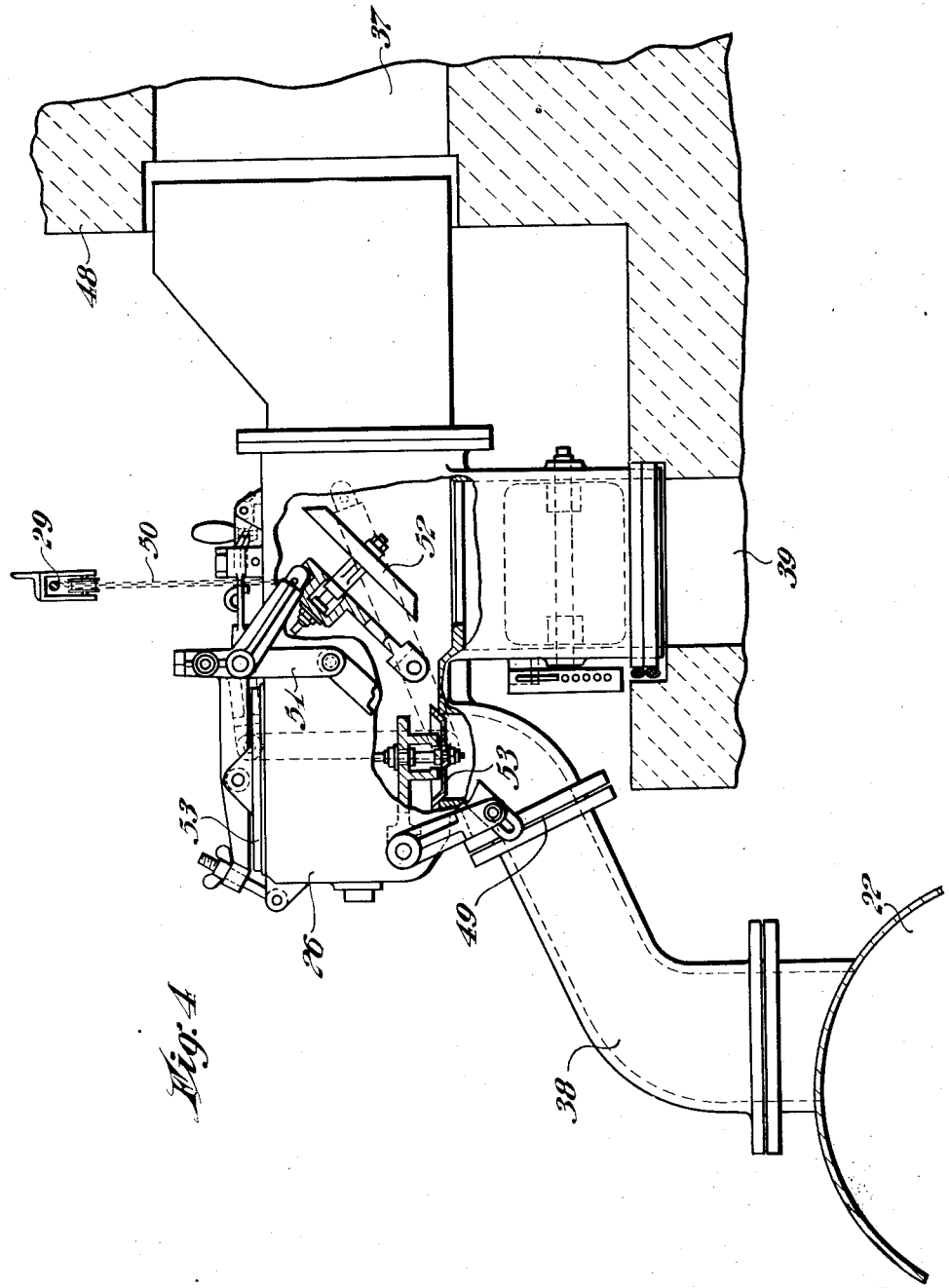

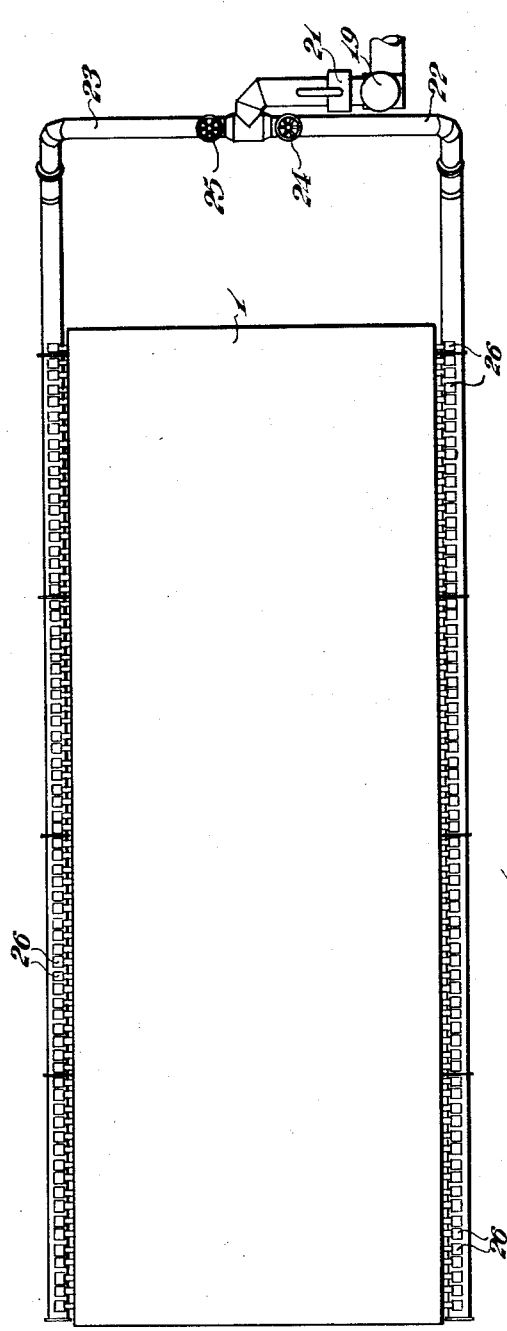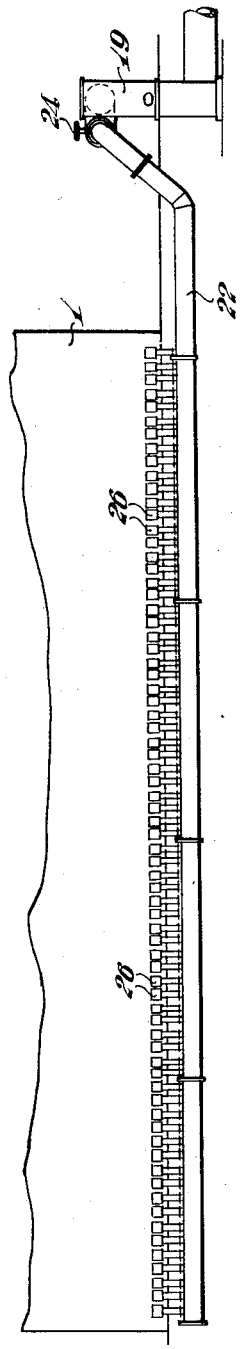

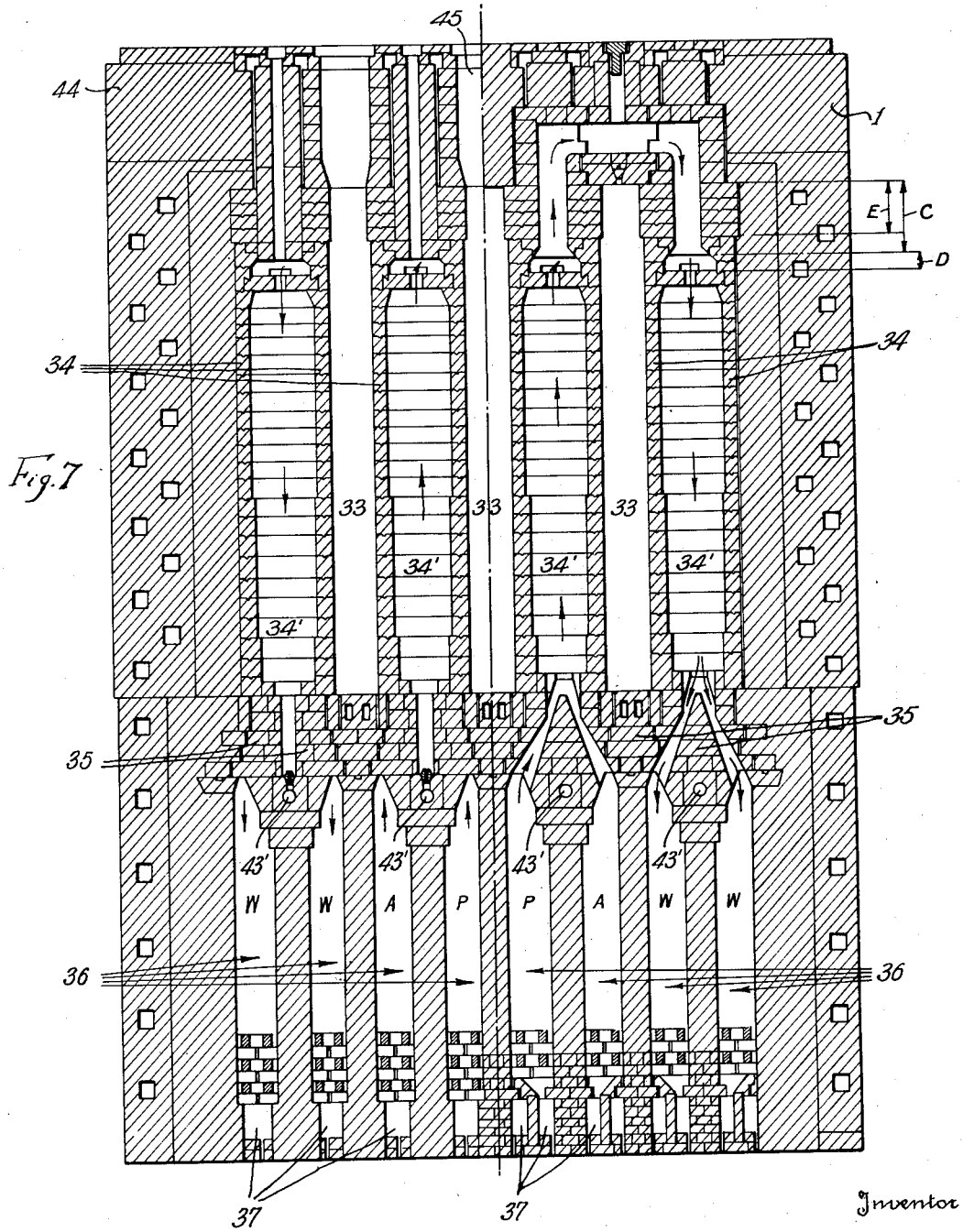

1,920,622

UNITED STATES PATENT OFFICE 1,920,622

GAS MANUFACTURE APPARATUS

Joseph Becker, O'Hara Township, Allegheny County, Pa., assignor to The Koppers Company of Delaware, a Corporation of Delaware Application November 5, 1930. Serial No. 493,589

3 Claims. (Cl. 202—105)

My invention relates to the manufacture of gas, such as coke-oven gas, and particularly to the disposal and utilization of foul air resulting from the liquid purification of such gas.

An object of my invention is to provide a simple and improved system for the disposal and utilization of foul air resulting from the actification of gas purification liquid.

A further object of my invention is to provide a system of foul air disposal of such character that the release of hydrogen sulphide into the atmosphere is avoided.

A further object of my invention is to provide a simple and efficient arrangement whereby actifier air from liquid purification apparatus may be supplied to coke-oven apparatus and utilized in the combustion of fuel gas therein.

A still further object of my invention is to provide an adequate arrangement whereby actifier air from liquid purification apparatus may be employed in coke ovens for purposes of combustion without corrosion of the structure in contact therewith and without condensation of moisture from the actifier air.

In the manufacture of gas, such as coke-oven gas, water gas and the like, from coal or other bituminous materials, the gas contains certain impurities comprising principally hydrogen sulphide. In view of the highly corrosive nature of hydrogen sulphide, it is necessary to remove this impurity before the gas is conveyed through pipe lines or passes through pumps or other machines.

In the usual method of removing hydrogen sulphide from gas, it is absorbed by bringing the gas into contact with a salt solution such as sodium carbonate. It is customary to actify the contaminated salt solution by aeration and to recirculate the salt solution through the absorption tower for further removal of hydrogen sulphide.

In certain localities the actifier air containing relatively large quantities of hydrogen sulphide may be discharged directly into the atmosphere without danger. However, in congested districts it is impossible to dispose of the actifier air in this manner and it is necessary to so change its character that the resulting products are not harmful to health or vegetation.

In accordance with the present invention, gas that is manufactured in coke ovens by the distillation of bituminous coal is treated in the usual manner by by-product apparatus for the removal of certain materials such as tar, ammonia and light oils, and is then purified by means of liquid purification apparatus. The actifier air produced by this apparatus is then treated for the removal of any entrained salt solution. The actifier air is then heated to such temperature that no moisture will be condensed therefrom when it enters the mains or the passageways of the coke-oven battery to which it is supplied.

The actifier air is supplied to the coke-oven battery through mains connected to the usual reversing boxes for controlling the flow of air and producer gas, when the latter is used as a fuel, into the regenerators of the coke-oven battery and which reversing boxes also control the flow of waste gases from the outflow regenerators.

Inasmuch as combination of the fuel gas in the coke-oven battery is dependent upon the actifier air, means are provided for automatically preventing the supply of fuel gas to the battery in case of failure of the actifying apparatus to supply air thereto. In the apparatus of the present invention, coke-oven gas is used as a fuel and the safety means described above comprises an electrical circuit controled by the speed of the actifier fan and which causes the reversing mechanism to assume its neutral position upon failure of the air supply.

The details of my invention will be described in connection with the accompany drawings, in which Figure 1 is a view partially in elevation and partially in perspective of apparatus embodying my invention, parts being broken away;

Fig. 2 is a view partially in elevation and partially in section of a modified form of apparatus for removing entrained salt solution from the actifier air;

Fig. 3 is a view in transverse vertical section of a portion of a coke-oven battery;

Fig. 4 is a vertical sectional view of the connections between an air main and a sole flue of the coke-oven battery and associated mechanisms;

Fig. 5 is a plan view of a coke-oven battery and an air supply system therefor;

Fig. 6 is an elevational view of the apparatus of Fig. 5, a portion of the coke-oven battery being broken away; and Fig. 7 is a vertical sectional elevational view of a part of the coke oven battery taken longitudinally thereof.

Referring particularly to Fig. 1, a coke-oven battery 1, which may consist of any desired number of ovens, produces coke-oven gas that flows through ascension pipes 2, only a portion of which are shown, into two collecting mains 3 that are located on opposite sides of the battery. The collecting mains 3 are connected by a cross-over pipe 4 and a suction main 5 withdraws the gas therefrom through a pressure regulator 6 to the usual by-product apparatus indicated by an appropriate legend.

The by-product apparatus is not shown as it constitutes no part of the present invention as it comprises the usual and well-known primary and secondary coolers, tar extractor and ammonia recovery apparatus. The gas then passes into and upwardly through an absorption tower 7 for the removal of hydrogen sulphide by means of a salt solution. An outlet pipe 8 conveys the gas to a gas holder or distribution system.

The gas purification liquid flows from the bottom of the absorption tower 7 through a pipe 9 into the top of an actifier 10. Air is forced into the actifier by means of a pump or fan 11 and removes hydrogen sulphide from the liquid and the latter passes in countercurrent therewith.

The liquid thus actified passes through an outlet pipe 12 by means of which it may be returned to the sprays 13 at the top of the absorption tower 7. The actifier air, which now contains a considerable proportion of hydrogen sulphide, passes out at the top of the actifier and through a pipe 14 into a scrubber 15, in which it passes upwardly in countercurrent to water supplied to sprays 16 by means of which any entrained salt solution is removed therefrom.

From the scrubber 15, the actifier air passes through pipes 17 and 18 to a heater 19, in which the actifier air passes through pipes 20 surrounded by steam for the purpose of raising the temperature of the air whereby no moisture will be deposited along the mains or in the sole flues of the coke-oven batteries. From the heater 19, the air passes through a pressure regulator 21 and into two mains 22 and 23 for distribution along both sides of a coke-oven battery.

Relative pressures in the mains 22 and 23 may be controlled by valves 24 and 25. The mains 22 and 23 are connected to each of the reversing boxes 26 for controlling the flow of air into the sole flues of the regenerators and the flow of waste gases therefrom, as the case may be.

A reversing mechanism 27, which may be of the usual motor-operated type that is controlled by clock mechanism, operates by means of cables 28 and 29, respectively, to control the gas guns for admitting coke-oven gas and to control the reversing boxes 26.

Reference may now be had to Figs. 3 and 7, in which certain details of the coke-oven battery are shown. One side only of the battery is illustrated but it will be understood that the opposite side of the battery is substantially a duplicate of that shown in the drawings. The battery 1 is supported by a foundation 32 and comprises a series of alternately-disposed oven chambers 33 and heating walls 34.

Beneath the oven chambers and heating walls and separated therefrom by horizontal brickwork 35 are a series of crosswise regenerators 36 which preferably extend half the width of the battery. Each regenerator is provided with a sole flue 37 that is connected through a reversing box 26 and an elbow 38 to the air main 22. The air main 22 corresponds in size and location to the usual producer gas main but differs from the latter in that it is connected to all of the reversing boxes instead of half of them, as is the case with the producer gas main. The reversing box 26 is also connected through a duct 39 to a waste gas flue 40, which may be connected to the usual stack.

A coke-oven gas main 42 supplies fuel gas for combustion in the various heating walls of the battery by means of gas guns 43, the latter being controlled by the cable 28 and feeding the fuel gas to coke oven channels 43' leading to the combustion flues 34' in the heating walls 34. The battery is provided with the usual roof or top 44 having any desired number of charging openings 45 and an offtake opening 46 connected to each oven chamber 33 and to an ascension pipe 2 whereby the gas may be conveyed to the collecting main 3. Coke-oven gas is supplied from the suction main to the mains 42 whereby the battery supplies its own fuel for underfiring.

The details of the connection of the foul air main 22 to a sole flue 37 are clearly shown in Fig. 4. The flange elbow 38 connects the main 22 to the lower side of the reversing box 26 which is connected directly to the outer end of the sole flue through the side wall 48 of the battery. Adjacent the upper flange of the elbow 38 is an orifice disc 49 for the purpose of properly regulating the amount of air passing therethrough.

The reversing box 26, which is operated by the cable 29 and a chain 50, is provided with a link-and-lever mechanism 51 for controlling valves 52 and 53. The valve 52 controls the connection of the sole flue 37 and the vertical duct 39 for waste gases. The valve 52 is shown in its open position.

The valve 53, which is closed when the valve 52 is open, controls the connection of the sole flue 37 and the air main 22. The usual air lid 53 with which the reversing boxes 26 are provided is clamped in its closed position.

In the operation of the reversing box 26, the movement of the cable 29 to release the chain 50 permits the valve 52 to close by gravity and at the same time to open the valve 53 to which it is mechanically connected through the link-and-lever mechanism 51. When the cable 29 is operated in the opposite direction to draw the chain 50 upward, the valves are restored to their illustrated position in which the air supply is cut off and the sole flue 37 is connected for the discharge of waste gases to the stack.

The general arrangement of the air mains 22 and 23 is shown in Figs. 5 and 6. It will be noted that the mains extend throughout the length of the battery 1 and are connected through the elbows 38 to all of the reversing boxes 26 on each side of the battery. The valves 24 and 25 make it possible to adjust the relative pressures in the mains 22 and 23 to compensate for the difference in the amount of fuel required because of the varying width of the charge due to the taper of the oven chamber.

In the construction of the scrubber 15 of Fig. 1, it will be noted that it is mounted on a foundation 55, preferably of concrete, and which is provided with a chamber 56 to which the pipe 14 is connected. The actifier air flows upwardly from the chamber 56 into the tower portion of the scrubber 15. The foundation 55 is also provided with a second chamber 57 to the top of which is connected the pipe 17. Both the chambers 56 and 57 constitute, also, sumps for the collection of any liquid that may flow therein and which is disposed of by means of suitable drains 58 and 59, respectively.

The chamber 57 is connected to the pipe 18, which is preferably in the form of a concrete conduit that is underground and is connected at its other end to an underground concrete chamber 60, upon which the heater 19 is supported. The latter is also provided with a suitable drain pipe 61.

The concrete chambers and conduits referred to above afford a simple and convenient means for conveying the actifier air underground across a comparatively great distance in the yard of a coke plant without its obstructing the surface of the yard or forming unsightly construction in what is ordinarily a clear space.

In the operation of the coke-oven battery 1, coke-oven gas is supplied to half the number of heating walls through the corresponding gas guns 43. The reversing boxes 26 are so adjusted that half the number supply air to the same heating walls that are supplied with coke-oven gas. The remaining reversing boxes are arranged for the flow of waste gases to the stack.

The reversing mechanism 27, which is time-controlled, operates periodically to reverse the positions of the valves for the gas guns 43 whereby the gas guns that were open are now closed and the other gas guns are open. Similarly, the reversing boxes that formerly admitted air now operate to discharge waste gases and the reversing boxes that formerly discharged waste gases now admit air from the corresponding mains.

The reversing mechanism has a neutral or intermediate position in which all of the gas guns are colsed. The actifier fan 11 is provided at one end of its shaft with a suitable device, such as a centrifugal switch 63, for controlling an electrical circuit 64 that is connected to an electric motor 65. The motor 65, when energized, is arranged to actuate the reversing mechanism 27 to its neutral position. Accordingly, in case of failure of the actifier fan 11 to operate and the resultant failure of the supply of air to the coke-oven battery, the supply of fuel gas to the battery is automatically cut off in order to avoid any danger of explosion.

While the scrubber 15 shown in the system of Fig. 1 employs water as the agent for removing entrained salt solution, the apparatus of Fig. 2 may, if desired, be substituted therefor. In this arrangement, a tower 66 is provided with sprays 67 at the top through which oil is introduced to flow downwardly in countercurrent to the actifier air. The oil, together with any liquid mixed therewith, flows from the bottom of the tower 66 through a pipe 68 into a sump 69, which serves as a settling tank. The oil is recirculated from the tank 69 by means of a pump 70. Any salt solution that may be decanted therefrom flows through a drain pipe 71 to any suitable place for disposal.

The system provided by my invention operates to efficiently dispose of hydrogen sulphide contained in the gas produced by coke-oven apparatus by removing it from the gas and then properly preparing the resulting actifier air with respect to its content and its temperature for introduction into the coke-oven apparatus for combustion purposes.

Thus the actifier air not only serves a useful purpose by reason of its being introduced into the oven under carefully regulated pressures, but the hydrogen sulphide therein is reduced to sulphur dioxide by its oxidation during combustion. The latter gas may safely be released into the atmosphere through the usual coke-oven station in cases where it would be unsafe or not permissible to release hydrogen sulphide.

The foregoing and other advantages will be apparent to those skilled in the operation of coke-oven batteries and the manufacture and treatment of fuel gas.

I claim as my invention:

1. In combination, a coke oven battery having a series of alternate coking chambers and heating walls therefor comprising combustion flues arranged side-by-side in a row and having means adapted for supplying fuel gas to said combustion flues and regenerators for air adapted for supplying preheated air to said combustion flues for combustion of said fuel gas; a gas purification absorption chamber and an actification chamber; means for recirculating a liquid through said absorption chamber and thence through said actification chamber; means for conveying gas from coking chambers through said absorption chamber for contact with liquid recirculated therethrough; air inlet means adapted for supplying air into said actification chamber for contact with liquid recirculated therethrough; a scrubbing chamber communicating with said actification chamber for conveying the air therefrom and adapted for scrubbing of entrained salt with liquid from the air conveyed thereby; a heating chamber communicating with said scrubbing chamber for conveying the air therefrom and adapted for heating the air conveyed thereby to such a temperature as to prevent condensation of moisture from said air when supplied to said regenerators for air; and means for conveying air while hot from the heating chamber into said air regenerators for conveyance thereby to the combusiton flues of the heating walls.

2. In combination, a coke oven battery having a series of alternate coking chamber and heating walls therefor comprising combustion flues arranged side-by-side in a row and having means adapted for supplying fuel gas to said combustion flues and preheating means for air adapted for heat exchange of heat of waste gas from said combustion flues and adapted for supplying preheated air to said combustion flues for combustion of said fuel gas; a gas purification absorption chamber and an actification chamber; means for recirculating a liquid through said absorption chamber and thence through said actification chamber; means for conveying gas from coking chambers through said absorption chamber for contact with liquid recirculated therethrough; air inlet means adapted for supplying air into said actification chamber for contact with liquid recirculated therethrough; a scrubbing chamber communicating with said actification chamber for conveying the air therefrom and adapted for scrubbing of entrained salt with liquid from the air conveyed thereby, a heating chamber communicating with said scrubbing chamber for conveying the air therefrom and adapted for heating the air conveyed thereby to such a temperature as to prevent condensation of moisture from said air when supplied to said preheating means for air; and means for conveying air while hot from the heating chamber into the preheating means for air for conveyance thereby to the combustion flues of the heating walls.

3. In combination, a coke oven battery having a series of alternate coking chambers and heating walls therefor comprising combustion flues arranged side-by-side in a row and having means adapted for supplying fuel gas to said combustion flues and regenerators for air adapted for supplying preheated air to said combustion flues for combustion of said fuel gas; a gas purification absorption chamber and an actification chamber; means for recirculating a liquid through said absorption chamber and thence through said actification chamber; means for conveying gas from coking chambers through said absorption chamber for contact with liquid recirculated therethrough; air inlet means adapted for supplying air into said actification chamber for contact with liquid recirculated therethrough; a heating chamber communicably connected with said actification chamber for conveying the air therefrom and adapted for heating the air conveyed thereby to such a temperature as to prevent condensation of moisture from said air when supplied to said regenerators for air and means for conveying the air while hot from the heating chamber into said air regenerators for conveyance thereby to the combustion flues of the heating walls.

JOSEPH BECKER.